US012567675B2

(12) United States Patent
Hong et al.

(10) Patent No.: US 12,567,675 B2
(45) Date of Patent: Mar. 3, 2026

(54) ANTENNA STRUCTURE

(71) Applicant: Wistron NeWeb Corp., Hsinchu (TW)

(72) Inventors: Yen-Ming Hong, Hsinchu (TW); Chin-Tang Huang, Hsinchu (TW); Wei-Shin Chen, Hsinchu (TW)

(73) Assignee: WISTRON NEWEB CORP., Hsinchu (TW)

(*) Notice: Subject to any disclaimer, the term of this patent is extended or adjusted under 35 U.S.C. 154(b) by 37 days.

(21) Appl. No.: 18/754,843

(22) Filed: Jun. 26, 2024

(65) Prior Publication Data

US 2025/0038407 A1 Jan. 30, 2025

(30) Foreign Application Priority Data

Jul. 28, 2023 (TW) ................................ 112128374

(51) Int. Cl.
*H01Q 13/18* (2006.01)
*H01Q 5/357* (2015.01)
*H01Q 5/378* (2015.01)

(52) U.S. Cl.
CPC ............ *H01Q 13/18* (2013.01); *H01Q 5/357* (2015.01); *H01Q 5/378* (2015.01)

(58) Field of Classification Search
CPC ........ H01Q 5/357; H01Q 5/364; H01Q 5/371; H01Q 5/378; H01Q 5/385; H01Q 5/392; H01Q 13/18
See application file for complete search history.

(56) References Cited

U.S. PATENT DOCUMENTS 10,454,156 B1 * 10/2019 Yang ........................ H01Q 1/48
2018/0323495 A1 * 11/2018 Wei ........................ H01Q 5/385
2022/0223996 A1 * 7/2022 Chen ........................ H01Q 1/38

FOREIGN PATENT DOCUMENTS

CN 115241646 A 10/2022

* cited by examiner

*Primary Examiner* — Amal Patel

(74) *Attorney, Agent, or Firm* — McClure, Qualey & Rodack, LLP

(57) ABSTRACT

An antenna structure includes a metal cavity, a first radiation element, a second radiation element, a third radiation element, and a dielectric substrate. The metal cavity has an opening region. The first radiation element has a first feeding point. The first radiation element is coupled to the metal cavity. The second radiation element has a second feeding point. The second radiation element is coupled to the metal cavity. The third radiation element is adjacent to the first radiation element and the second radiation element. The third radiation element is coupled to the metal cavity. The dielectric substrate is adjacent to the opening region of the metal cavity. The first radiation element, the second radiation element, and the third radiation element are disposed on the dielectric substrate.

17 Claims, 5 Drawing Sheets

100

ANTENNA STRUCTURE

CROSS-REFERENCE TO RELATED PATENT APPLICATION

This application claims the benefit of priority to Taiwan Patent Application No. 112128374, filed on Jul. 28, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The embodiments of the present disclosure relate to an antenna structure, in particular to a wideband antenna structure.

BACKGROUND OF THE DISCLOSURE

With the advancement of mobile communication technology, mobile devices have become increasingly common in recent years. Examples include laptops, mobile phones, multimedia players, and other portable electronic devices with hybrid functionalities. Mobile devices typically come with wireless communication capabilities to meet people's needs. Some cover long-range wireless communication ranges. For instance, mobile phones use 2G, 3G, Long Term Evolution (LTE) systems, and communicate using frequency bands such as 700 MHz, 850 MHz, 900 MHz, 1800 MHz, 1900 MHZ, 2100 MHz, 2300 MHz, and 2500 MHz. Others cover short-range wireless communication ranges. For example, Wi-Fi and Bluetooth systems use frequency bands of 2.4 GHz, 5.2 GHZ, and 5.8 GHz.

Antennas are indispensable components in the field of wireless communication. If an operational bandwidth of an antenna used for signal reception or transmission is too narrow, it can easily lead to a decline in the communication quality of mobile devices. Therefore, designing a compact, wideband antenna structure is a significant challenge for designers.

SUMMARY OF THE DISCLOSURE

In an exemplary embodiment, the present disclosure provides an antenna structure including a metal cavity, a first radiation element, a second radiation element, a third radiation element, and a dielectric substrate. The metal cavity has an opening region. The first radiation element has a first feeding point in which the first radiation element is coupled to the metal cavity. The second radiation element has a second feeding point in which the second radiation element is coupled to the metal cavity. The third radiation element is adjacent to the first radiation element and the second radiation element in which the third radiation element is coupled to the metal cavity. The dielectric substrate is adjacent to the opening region of the metal cavity. The first radiation element, the second radiation element, and the third radiation element are disposed on the dielectric substrate.

In some embodiments, the antenna structure covers a first frequency band, a second frequency band, and a third frequency band.

In some embodiments, the first frequency band is from 2400 MHz to 2500 MHz, the second frequency band is from 5150 MHz to 5850 MHz, and the third frequency band is from 5925 MHz to 7125 MHz.

In some embodiments, the metal cavity is presented as an open hollow cuboid.

In some embodiments, a length of the metal cavity is substantially from 0.25 to 0.3 times the wavelength of the first frequency band.

In some embodiments, a width of the metal cavity is substantially from 0.06 to 0.07 times the wavelength of the first frequency band.

In some embodiments, the metal cavity further has a first edge, a second edge, a third edge, and a fourth edge. The opening region is enclosed by the first edge, the second edge, the third edge, and the fourth edge.

In some embodiments, the second radiation element is substantially parallel to the first radiation element.

In some embodiments, a length of the second radiation element is substantially greater than or equal to a length of the first radiation element.

In some embodiments, a length of the first radiation element is substantially smaller than or equal to 0.5 times the wavelength of the second frequency band.

In some embodiments, the length of the second radiation element is substantially smaller than or equal to 0.5 times the wavelength of the second frequency band.

In some embodiments, the first radiation element is coupled to the first edge of the metal cavity.

In some embodiments, the second radiation element is coupled to the first edge and the second edge of the metal cavity.

In some embodiments, the first radiation element, the first edge of the metal cavity, and the second radiation element form a resonance path, and a length of the resonance path is substantially equal to 0.5 times the wavelength of the third frequency band.

In some embodiments, the third radiation element includes a first segment, a second segment, and a third segment. The first segment is coupled to the third edge and the fourth edge of the metal cavity. The second segment is coupled to the first segment. The third segment is coupled to the first segment, the second segment, and the second edge and the third edge of the metal cavity.

In some embodiments, a total length of the first segment and the second segment is substantially equal to 0.25 times the wavelength of the first frequency band.

In some embodiments, a total length of the first segment and the second segment is substantially equal to 3 times an interval between the second edge and the fourth edge of the metal cavity.

In some embodiments, a first coupling gap is formed between the second segment and the first radiation element. A second coupling gap is formed between the third segment and the first radiation element. A third coupling gap is formed between the third segment and the second radiation element. A fourth coupling gap is formed between the second segment and the fourth edge of the metal cavity.

In some embodiments, a width of the first coupling gap is substantially from 0.8 mm to 1.2 mm. A width of the second coupling gap is substantially from 0.6 mm to 0.8 mm. A width of the third coupling gap is substantially from 0.4 mm to 0.6 mm. A width of the fourth coupling gap is substantially from 0.2 mm to 1.2 mm.

In some embodiments, the antenna structure further includes a metal element coupled to the first edge and the fourth edge of the metal cavity.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
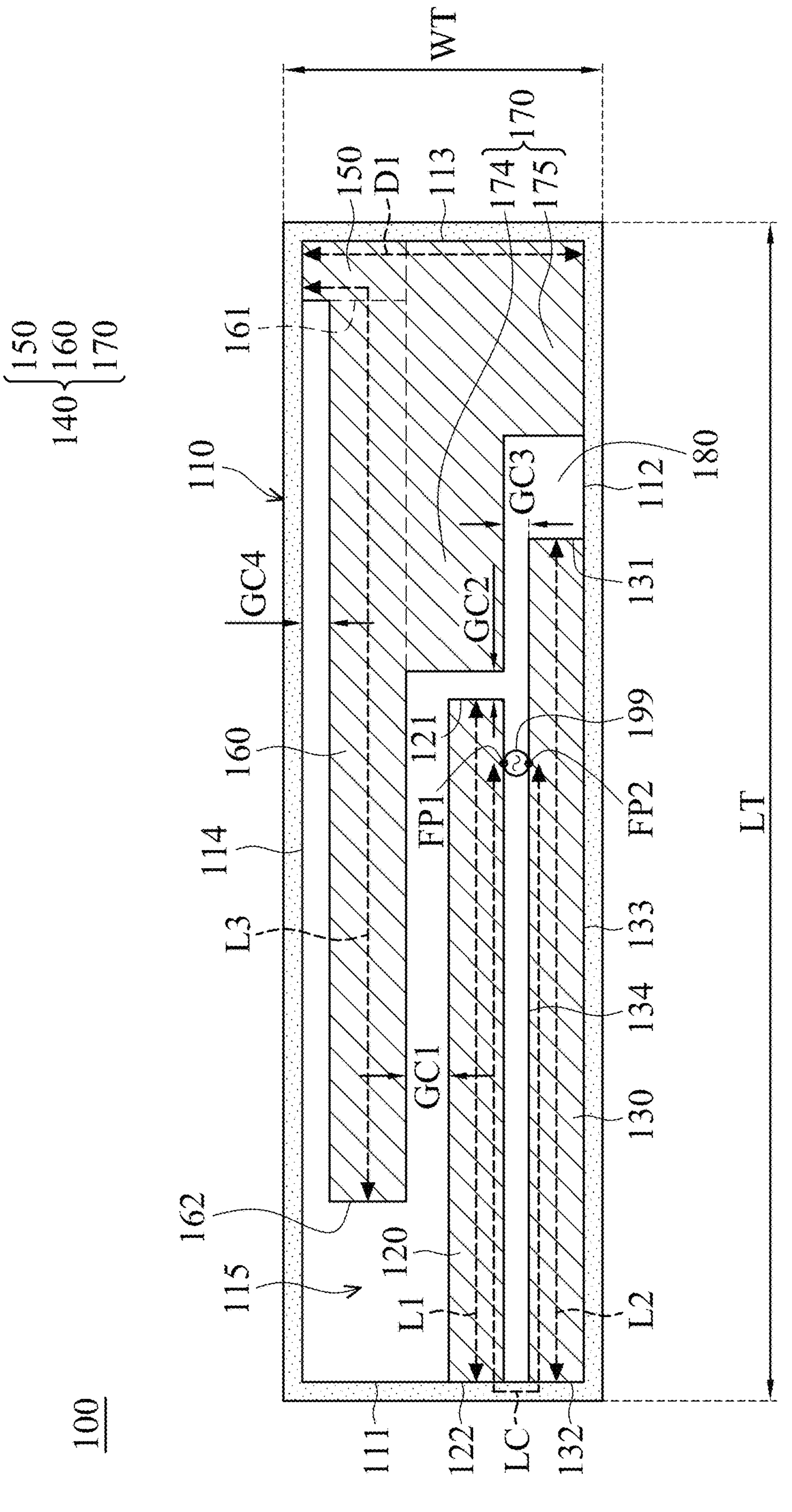
FIG. 1 is a front view of an antenna structure according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like. The term "roughly", "substantially" or "about" refers to the ability of a person having ordinary skilled in the art to address the technical issues within an acceptable range of error and achieve the fundamental technical effect. Additionally, the term "coupling" in the disclosure includes any direct and indirect means of electrical connection.

Figure 2:
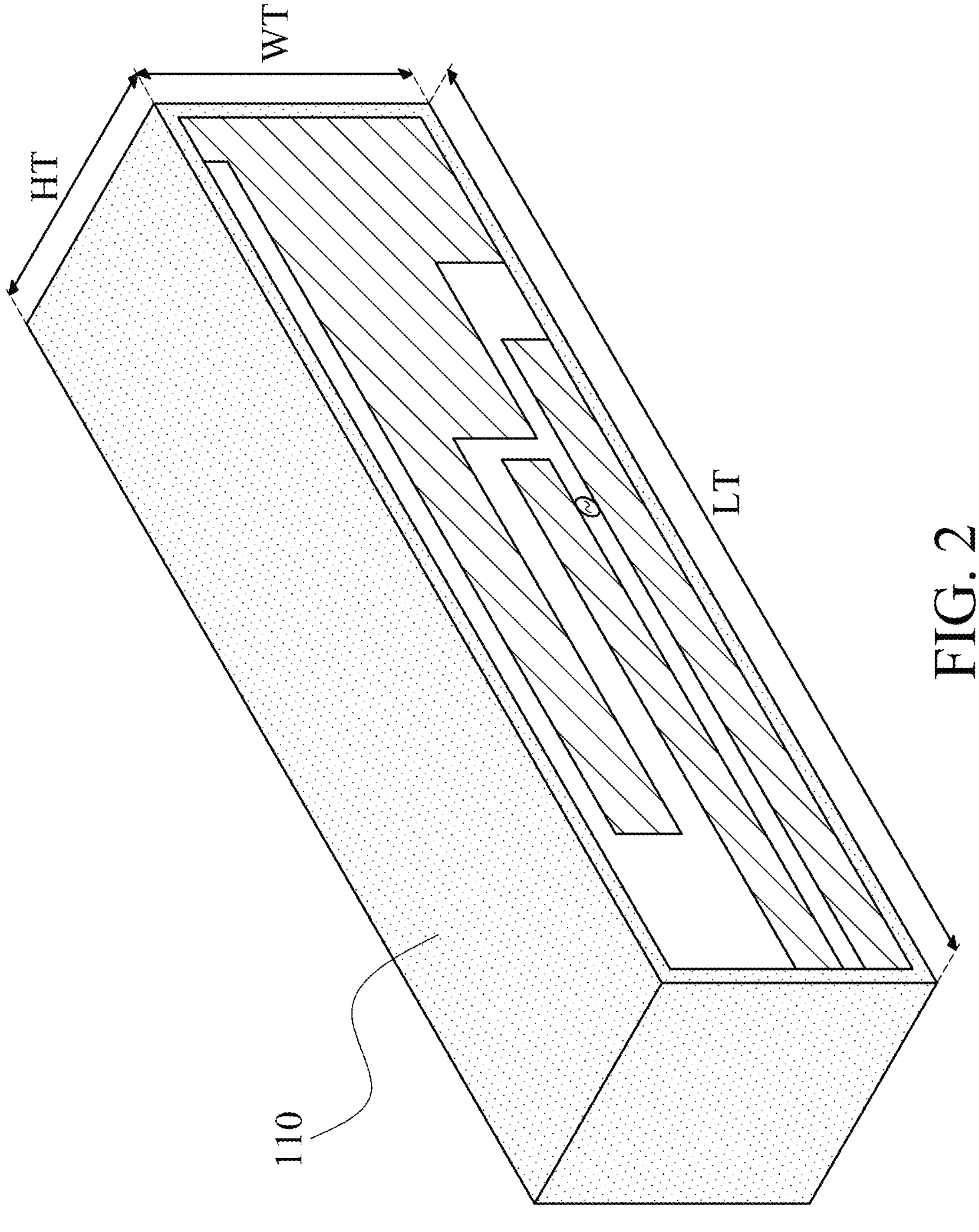
FIG. 2 is a perspective view of the antenna structure according to an embodiment of the present disclosure.

FIG. 1 is a front view of an antenna structure 100 according to an embodiment of the present disclosure. FIG. 2 is a perspective view of the antenna structure 100 according to the embodiment of the present disclosure. Refers to FIGS. 1 and 2 together. The antenna structure 100 can be applied to an electronic device, such as a desktop computer. As shown in FIGS. 1 and 2, the antenna structure 100 at least includes a metal cavity 110, a first radiation element 120, a second radiation element 130, a third radiation element 140, and a dielectric substrate 180. The first radiation element 120, the second radiation element 130, and the third radiation element 140 can all be made of a metal material, such as copper, silver, aluminum, iron, or an alloy thereof.

The metal cavity 110 can be substantially an open hollow cuboid, but is not limited thereto. Specifically, the metal cavity 10 has a first edge 111, a second edge 112, a third edge 113, a fourth edge 114, and an opening region 115. The third edge 113 can be opposite and substantially parallel to the first edge 111. The fourth edge 114 can be opposite and substantially parallel to the second edge 112. Besides, the opening region 115 as mentioned can be completely enclosed by the first edge 111, the second edge 112, the third edge 113, and the fourth edge 114 of the metal cavity 110.

For example, the dielectric substrate 180 can be a flame retardant 4 substrate, a printed circuit board (PCB), or a flexible printed circuit (FPC). The dielectric substrate 180 is adjacent to the opening region 115 of the metal cavity 110 in which the first radiation element 120, a second radiation element 130, and a third radiation element 140 can all be disposed on the same surface of the dielectric substrate 180. For example, the first radiation element 120, the second radiation element 130, and the third radiation element 140 can all be within the opening region 115 of the metal cavity 110, and can all be enclosed by the first edge 111, the second edge 112, the third edge 113 and the fourth edge 114 of the metal cavity 110. In other embodiments, the dielectric substrate 180 can be aligned flush with the opening region 115 of the metal cavity 110. Alternatively, the area of the dielectric substrate 180 can be slightly greater than the area of the opening region 115 of the metal cavity 110, allowing the dielectric substrate 180 to completely cover the opening region 115 of the metal cavity 110.

The first radiation element 120 has a first end 121 and a second end 122 in which a first feeding point FP1 is adjacent to the first end 121 of the first radiation element 120. The second end 122 of the first radiation element 120 is coupled to the first edge 111 of the metal cavity 110. The first feeding point FP1 can be further coupled to a positive electrode of a signal source 199. For example, the signal source 199 can be a radio frequency (RF) module, which can be used to excite the antenna structure 100. It should be noted that "adjacent" in the present disclosure can be directed to an interval between the corresponding two elements which is less than a predetermined distance (e.g., 10 mm or less), but usually does not include the situation where the two corresponding elements are in direct contact with each other (i.e., the distance/spacing between them is shortened to 0). In some embodiments, the first radiation element 120 can be substantially a strip shape, but not limited thereto.

The second radiation element 130 has a first end 131 and a second end 132, and further has a first side edge 133 and a second side edge 134. The first end 131 of the second radiation element 130 is an open end. The second end 132 of the second radiation element 130 is coupled to first end 111 of the metal cavity 110. The first side edge 133 of the second radiation element 130 is coupled to the second edge 112 of the metal cavity 110. A second feeding point FP2 is at the second side edge 134 of the second radiation element 130. The second feeding point FP2 can be further coupled to a negative electrode of the signal source 199. In addition, a length L2 of the second radiation element 130 can be greater than a length L1 of the first radiation element 120. In some embodiments, the first radiation element 120, the first side edge 111 of the metal cavity 110, and the second radiation element 130 can form a resonant path LC. For example, the resonant path LC as mentioned can be substantially a loop shape, and its starting point and ending point can be adjacent to the first feeding point FP1 and the second feeding point FP2 respectively, but is not limited thereto. In some embodiments, the second radiation element 130 can be substantially a strip shape, which can be roughly parallel to the first radiation element 120, but is not limited thereto.

The third radiation element 140 can be substantially an irregular shape, which can be simultaneously adjacent to the first radiation element 120 and the second radiation element 130, but is not limited thereto. In some embodiments, the third radiation element 140 includes a first segment 150, a second segment 160, and a third segment 170 which are coupled to each other, which can be described in detail as follows.

The first segment 150 can be substantially a rectangle, but is not limited thereto. The first segment 150 is coupled to the third edge 113 and the fourth edge 114 of the metal cavity 110. That is, the first segment 150 can be located at a corner of the opening region 115 of the metal cavity 110. In some other embodiments, the first segment 150 can also be only coupled to the third edge 113 of the metal cavity 110, but not directly in contact with the fourth edge 114 of the metal cavity 110.

The second segment 160 can be substantially a strip shape which can be substantially parallel to the first radiation element 120, but is not limited thereto. Specifically, the second segment 160 has a first end 161 and a second end 162. The first end 161 of the second segment 160 is coupled to the first segment 150, and the second end 162 of the second segment 160 is an open end. For example, the second end 162 of the second segment 160 and the first end 121 of the first radiation element 120 can be extended in substantially opposite directions and away from each other.

The third segment 170 can be substantially an L-shape, but is not limited thereto. The third segment 170 is coupled to the first segment 150, the second segment 160, and the second edge 112 and the third edge 113 of the metal cavity 110. In some embodiments, the third segment 170 includes a first part 174 and a second part 175 which can be coupled to each other. In some embodiment, the length of the first part 174 can be greater than or equal to the length of the second part 175.

In some embodiments, a first coupling gap GC1 can be formed between the second segment 160 and the first radiation element 120. A second coupling gap GC2 can be formed between the first part 174 of the third segment 170 and the first radiation element 120. A third coupling gap GC3 can be formed between the first part 174 of the third segment 170 and the second radiation element 130. A fourth coupling gap GC4 can be formed between the second segment 160 and the fourth edge 114 of the metal cavity 110.

Figure 3:
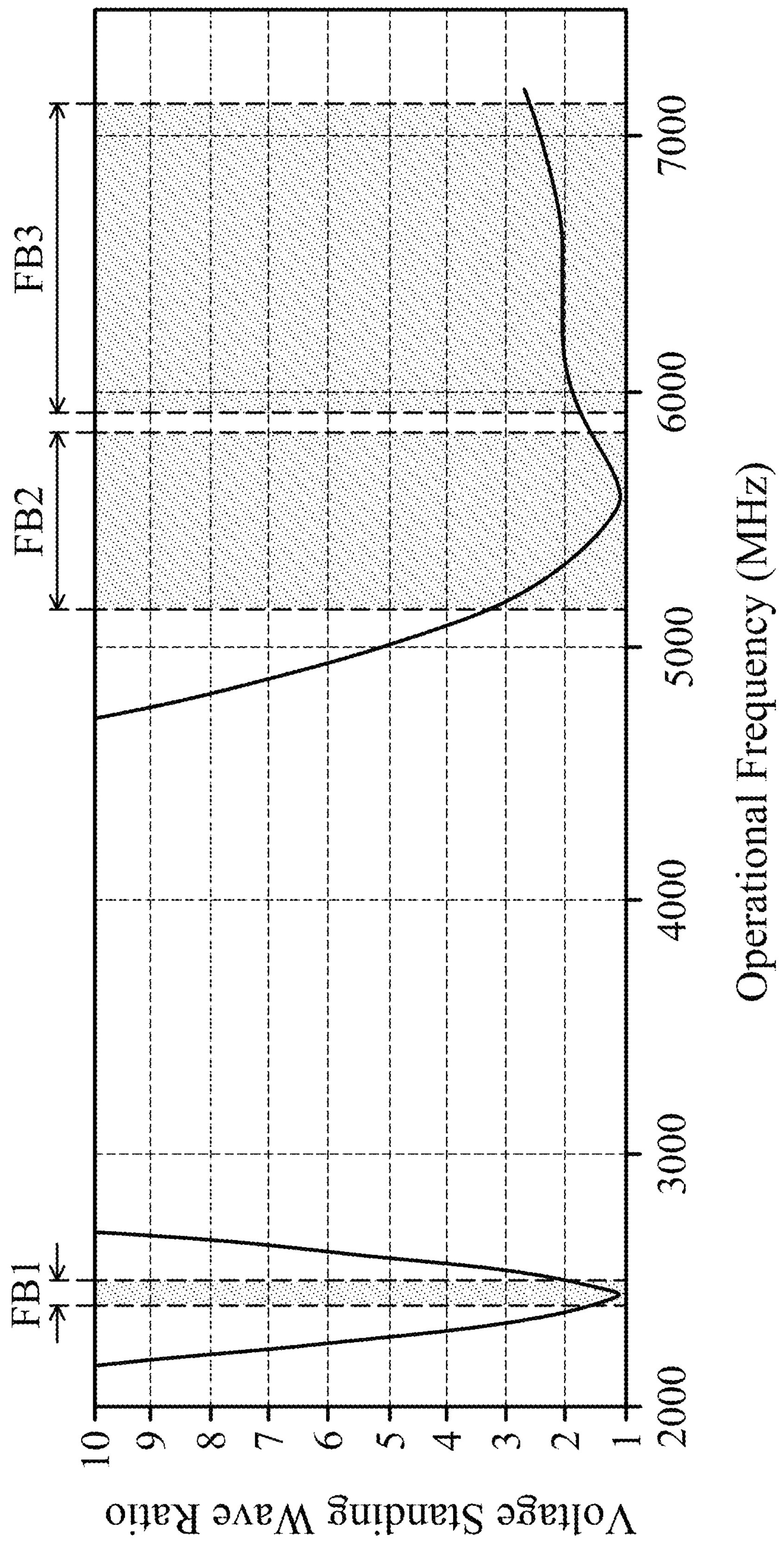
FIG. 3 is a voltage standing wave ratio (VSWR) diagram of the antenna structure according to an embodiment of the present disclosure.

FIG. 3 is a voltage standing wave ratio (VSWR) diagram of the antenna structure 100 according to an embodiment of the present disclosure. The horizontal axis represents an operational frequency (MHz), and the vertical axis represents VSWR. According to the measurement result of FIG. 3, the antenna structure 100 can covers a first frequency band FB1, a second frequency band FB2, and a third frequency band FB3. For example, the first frequency band FB1 can be from 2400 MHz to 2500 MHz, the second frequency band FB2 can be from 5150 MHz to 5850 MHz, and the third frequency band FB3 can be from 5925 MHz to 7125 MHz. Therefore, the antenna structure 100 may at least support broadband operation of the traditional wireless local area network (WLAN) and the new generation Wi-Fi 6E.

In some embodiments, the operational principle of the antenna structure 100 can be described as follows. The third radiation element 140 can be coupled and excited by the first radiation element 120 to generate the first frequency band FB1 as mentioned. The first radiation element 120, the second radiation element 130, and the third radiation element 140 can be jointly excited to generate the second frequency band FB2 as mentioned. The resonant path LC can be excited to generate the third frequency band FB3 as mentioned. According to practical measurements, the first coupling gap GC1, the second coupling gap GC2, the third coupling gap GC3, and the fourth coupling gap GC4 can be configured to fine tune the impedance matching of the first frequency band FB1 and the second frequency band FB2 as mentioned. Furthermore, the addition of the metal cavity 110 can eliminate the back radiation of the antenna structure 100, thereby enhancing the radiation gain of the antenna structure 100.

In some embodiments, the dimensions of elements of the antenna structure 100 can be as follows. A length LT of the metal cavity 110 can be from 0.25 to 0.3 times the wavelength (0.25λ~3λ) of the first frequency band FB1 of the antenna structure 100. A width WT of the metal cavity 110 can be from 0.06 to 0.07 times the wavelength (0.06λ~0.07λ) of the first frequency band FB1 of the antenna structure 100. A depth HT of the metal cavity 110 can be from 0.07 to 0.08 times the wavelength (0.07λ~0.08λ) of the first frequency band FBI of the antenna structure 100. A length L1 of the first radiation element 120 can be smaller than or equal to 0.5 times the wavelength (0.5λ) of the second frequency band FB2 of the antenna structure 100. A length L2 of the second radiation element 130 can be smaller than or equal to 0.5 times the wavelength (0.5λ) of the second frequency band FB2 of the antenna structure 100. The length of the resonant path LC can be substantially equal to 0.5 times the wavelength (0.5λ) of the third frequency band FB3 of the antenna structure 100. In the third radiation element 140, a total length L3 of the first segment 150 and the second segment 160 can be substantially equal to 0.25 times the wavelength (0.25λ) of first frequency band B1 of the antenna structure 100. In addition, the total length L3 of the first segment 150 and the second segment 160 can also be substantially equal to 3 times of an interval D1 between the second edge 112 and the fourth edge 114 of the metal cavity 110 (i.e., L3=3*D1). Alternatively, the total length L3 as mentioned can be substantially equal to 3 times the width WT of the metal cavity 110 (i.e., L3=3*WT). In other words, the interval D1 as mentioned can also be substantially equal to 1/12 times the wavelength (λ/12) of the first frequency band FB1 of the antenna structure 100. The width of the first coupling gap GC1 is from 0.8 mm to 1.2 mm. The width of the second coupling gap GC2 is from 0.6 mm to 0.8 mm. The width of the third coupling gap GC3 is from 0.4 mm to 0.6 mm. The width of the fourth coupling gap GC4 is from 0.2 mm to 1.2 mm. The ranges of the above element sizes are obtained according to the results of multiple experiments, which help to optimize the radiation gain, impedance matching, and operational bandwidth of the antenna structure 100.

Figure 4:
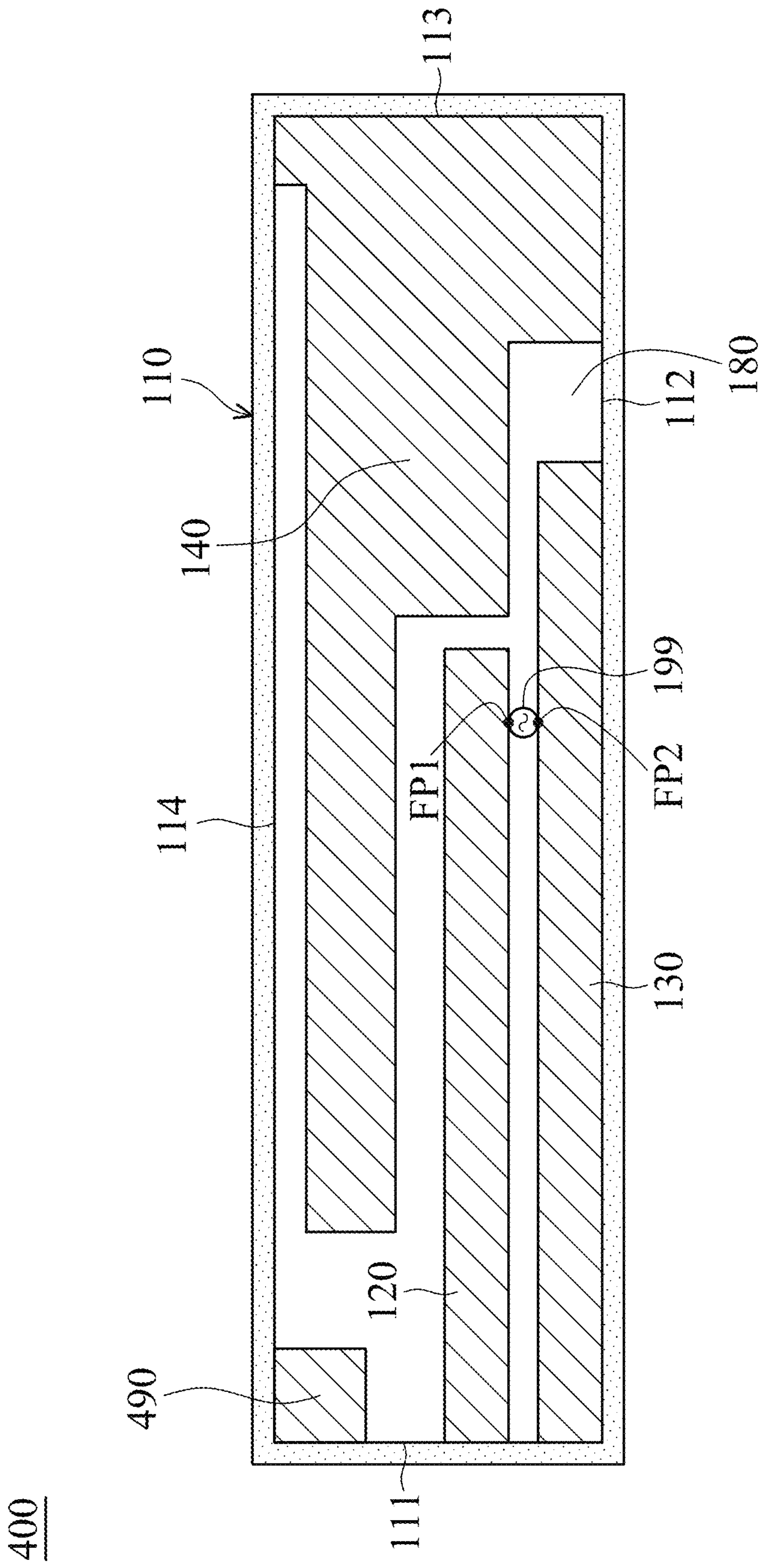
FIG. 4 is a front view of an antenna structure according to an embodiment of the present disclosure.

FIG. 4 is a front view of an antenna structure 400 according to an embodiment of the present disclosure. FIG. 4 is similar to FIGS. 1 and 2. In the embodiment of the FIG. 4, the antenna structure 400 further includes a metal element 490 which can be disposed on the dielectric substrate 180. The metal element 490 is coupled to the first edge 111 and the fourth edge 114 of the metal cavity 110 in which the metal element 490 can be further separated from the first radiation element 120, the second radiation element 130, and the third radiation element 140. For example, the metal element 490 can be used as a connection element, and the addition thereof helps to reduce the difficulty of assembling the antenna structure 400. In some embodiments, the metal element 490 can be substantially a square or a rectangle, but is not limited thereto. The remaining feature of the antenna structure 400 in FIG. 4 are similar to the antenna structure 100 in FIGS. 1 and 2, so both embodiments can achieve similar operational effects.

Figure 5:
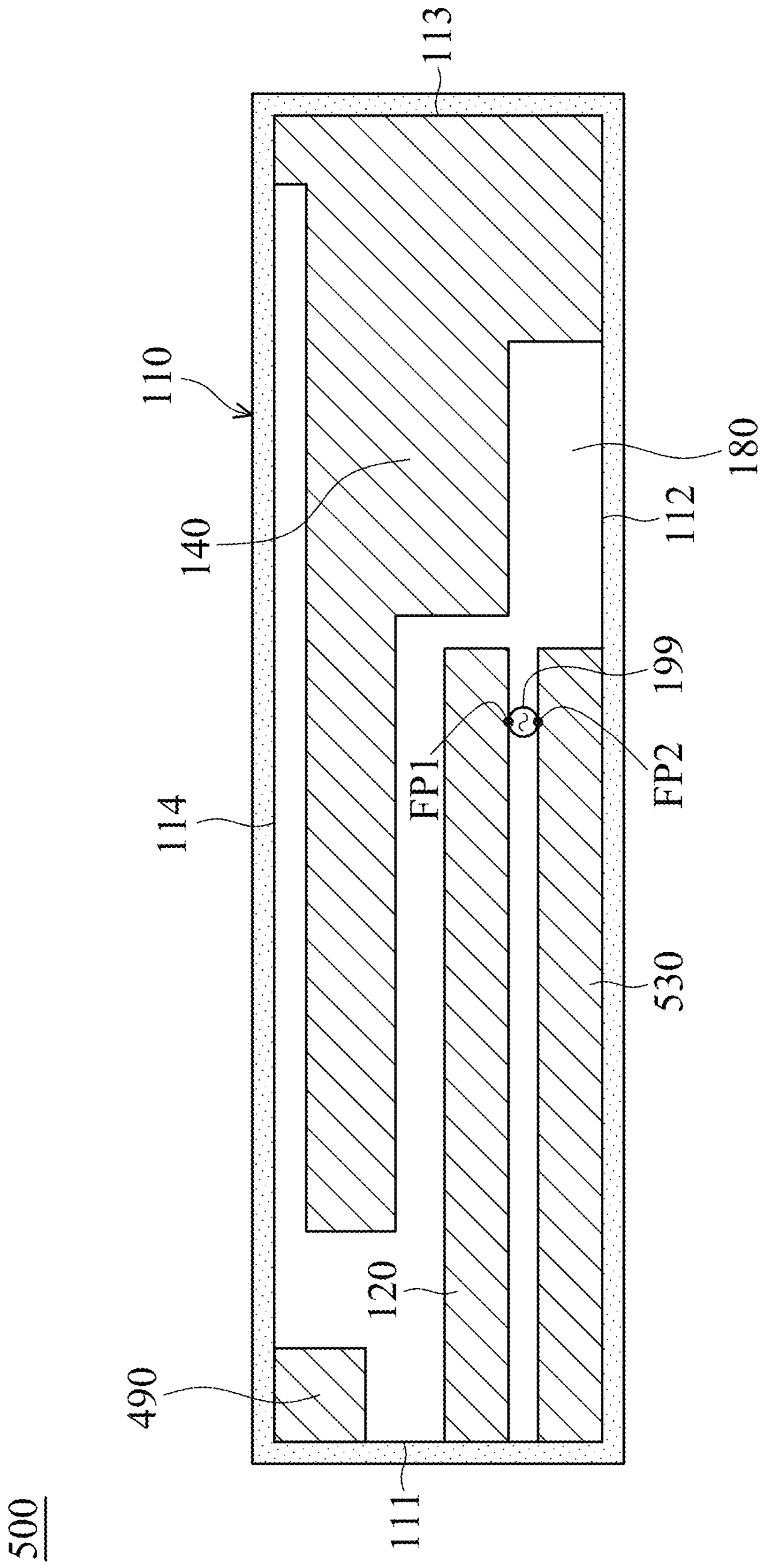
FIG. 5 is a front view of an antenna structure according to an embodiment of the present disclosure.

FIG. 5 is a front view of an antenna structure 500 according to an embodiment of the present disclosure. FIG. 5 is similar to FIG. 4. In the embodiment of FIG. 5, a second radiation element 530 and the first radiation element 120 of the antenna structure 500 have substantially the same length.

According to the real measurement results, the equal-length design helps to further fine tune the impedance matching of the second frequency band FB2 of the antenna structure 500. The remaining features of the antenna structure 500 in FIG. 5 are similar to the antenna structure 400 in FIG. 4, so both embodiments can achieve similar operational effects.

The present disclosure provides a novel antenna structure. Compared to traditional design, the present disclosure at least has the advantages of small size, wide frequency band, high radiation gain, and operability in different environments, so it is very suitable for application in various communication devices.

It is noted that element sizes, element shapes, and frequency ranges as mentioned are not limitations of the present disclosure. Antenna designers can adjust these settings according to different needs. The antenna structure of the present disclosure is not limited to the states as shown in FIGS. 1-5. The present disclosure may only include any one or multiple features of any one or multiple embodiments of FIGS. 1-5. In other words, not all the features as shown in the figures must be implemented in the antenna structure of the present disclosure at the same time.

The foregoing description of the disclosure has been presented only for the purposes of illustration and description option of the exemplary embodiments and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure, comprising:

a metal cavity having an opening region;

a first radiation element having a first feeding point, wherein the first radiation element is coupled to the metal cavity;

a second radiation element having a second feeding point, wherein the second radiation element is coupled to the metal cavity;

a third radiation element adjacent to the first radiation element and the second radiation element, wherein the third radiation element is coupled to the metal cavity; and a dielectric substrate adjacent to the opening region of the metal cavity, wherein the first radiation element, the second radiation element, and the third radiation element are disposed on the dielectric substrate;

wherein the antenna structure covers a first frequency band, a second frequency band, and a third frequency band;

wherein the metal cavity further has a first edge, a second edge, a third edge, and a fourth edge, and the opening region is enclosed by the first edge, the second edge, the third edge, and the fourth edge;

wherein the first radiation element, the first edge of the metal cavity, and the second radiation element form a resonance path, and a length of the resonance path is substantially equal to 0.5 times the wavelength of the third frequency band.

2. The antenna structure according to claim 1, wherein the first frequency band is from 2400 MHz to 2500 MHz, the second frequency band is from 5150 MHz to 5850 MHz, and the third frequency band is from 5925 MHz to 7125 MHz.

3. The antenna structure according to claim 1, wherein the metal cavity is presented as an open hollow cuboid.

4. The antenna structure according to claim 1, wherein a length of the metal cavity is substantially from 0.25 to 0.3 times the wavelength of the first frequency band.

5. The antenna structure according to claim 1, wherein a width of the metal cavity is substantially from 0.06 to 0.07 times the wavelength of the first frequency band.

6. The antenna structure according to claim 1, wherein the second radiation element is substantially parallel to the first radiation element.

7. The antenna structure according to claim 1, wherein a length of the second radiation element is substantially greater than or equal to a length of the first radiation element.

8. The antenna structure according to claim 1, wherein a length of the first radiation element is substantially smaller than or equal to 0.5 times the wavelength of the second frequency band.

9. The antenna structure according to claim 1, wherein a length of the second radiation element is substantially smaller than or equal to 0.5 times the wavelength of the second frequency band.

10. The antenna structure according to claim 1, wherein the first radiation element is coupled to the first edge of the metal cavity.

11. The antenna structure according to claim 1, wherein the second radiation element is coupled to the first edge and the second edge of the metal cavity.

12. The antenna structure according to claim 1, wherein the third radiation element comprises:

a first segment, coupled to the third edge and the fourth edge of the metal cavity;

a second segment, coupled to the first segment; and a third segment, coupled to the first segment, the second segment, and the second edge and the third edge of the metal cavity.

13. The antenna structure according to claim 12, wherein a total length of the first segment and the second segment is substantially equal to 0.25 times the wavelength of the first frequency band.

14. The antenna structure according to claim 12, wherein a total length of the first segment and the second segment is substantially equal to 3 times an interval between the second edge and the fourth edge of the metal cavity.

15. The antenna structure according to claim 12, wherein a first coupling gap is formed between the second segment and the first radiation element, a second coupling gap is formed between the third segment and the first radiation element, a third coupling gap is formed between the third segment and the second radiation element, and a fourth coupling gap is formed between the second segment and the fourth edge of the metal cavity.

16. The antenna structure according to claim 15, wherein a width of the first coupling gap is substantially from 0.8 mm to 1.2 mm, a width of the second coupling gap is substantially from 0.6 mm to 0.8 mm, a width of the third coupling gap is substantially from 0.4 mm to 0.6 mm, and a width of the fourth coupling gap is substantially from 0.2 mm to 1.2 mm.

17. The antenna structure according to claim 1, further comprising:

a metal element coupled to the first edge and the fourth edge of the metal cavity.

* * * * *